United States Patent [19]

Clayton et al.

[11] Patent Number: 4,845,624
[45] Date of Patent: Jul. 4, 1989

[54] RELATIONAL DATA BASE LOCK AVOIDANCE SYSTEM

[75] Inventors: Neil H. Clayton, Apalachin; Jose L. Rivero, Endwell; Kuo-Chang Sun, Endicott, all of N.Y.

[73] Assignee: International Business Machines Corporation, Armonk, N.Y.

[21] Appl. No.: 22,315

[22] Filed: Mar. 5, 1987

[51] Int. Cl.[4] .................................. G06F 7/00
[52] U.S. Cl. ........................... 364/200; 364/282.1
[58] Field of Search ... 364/200 MS File, 900 MS File

[56] References Cited

U.S. PATENT DOCUMENTS

| | | | |
|---|---|---|---|
| 4,096,561 | 6/1978 | Trinchieri | 364/200 |
| 4,564,903 | 1/1986 | Guyette et al. | 364/300 |
| 4,627,019 | 12/1986 | Ng | 364/900 |
| 4,660,144 | 4/1987 | Walsh | 364/200 |
| 4,694,396 | 9/1987 | Weisshaar et al. | 364/300 |
| 4,714,992 | 12/1987 | Gladney et al. | 364/200 |

Primary Examiner—Gareth D. Shaw
Assistant Examiner—Michael A. Jaffe
Attorney, Agent, or Firm—Elmer W. Galbi; Richard E. Bee

[57] ABSTRACT

The present invention is directed to a relational data base system which is operating in a virtual machine environment. The invention provides a system that includes a disconnected virtual machine which is running in the same virtual machine environment as is the relational data base. Insert and Update requests to the system are generated by programs running in user controlled virtual machines. Other users issue select and view requests which lock out insert and update requests which relate to the same data domain. With the present invention Insert and Update requests go to the disconnected virtual machine which ques them and applies them against the relational data base in the order that the requests are received. In this way, while a select is being executed on data in a particular domain of the data base, update and insert request for the same domain will be held by the virtual machine and the operator will not be "locked out" of the system.

4 Claims, 2 Drawing Sheets

RELATIONAL DATA BASE LOCK AVOIDANCE SYSTEM

TECHNICAL FIELD

The present invention relates to a computerized data base system and more particularly to a relational data base system.

BACKROUND AND PRIOR ART

There are a wide variety of systems available for storing and retrieving data utilizing computer systems. Relational Data Bases are one type of widely used data base system. A general description of relational data base systems can be found in a publication entitled *SOL/DS Systems Concepts and Facilities* which is publicly available from the IBM Corporation as publication number GH24-5065.

The International Business Machines Corporation markets a Relational Data Base system called SQL/DS as their program product number 5748XXJ-B (release 3.5). The system marketed by IBM is described in a publication commercially available from IBM as publication number GH24-5064.

The SQL/DS data base system runs under the operating system marketed by IBM that is called the IBM Virtual Machine/Systems Product. The IBM Virtual Machine/Systems Product is described in a publication entitled "Virtual Machine/Systems Product Introduction" available from IBM as publication number GC19-6200.

One problem associated with multi user relational data base systems such as the SQL/DS system is that when one user is selecting data from a particular domain in a particular table in the data base, other users who try to insert data into the same table and the same domain are "locked out" and they must wait until the first user's request has been processed. In such situations, the system processes all requests in the order that they are received and the wait time that an operator experiences is dependent on the length of time that the first user is processing or viewing requests.

In some applications of multi user relational base systems, such as for example in an application where a relational data base is being used to keep track of a parts inventory, the users can be divided into two types. First, there are users that select and view data, and second, there are users that update and insert data. In such systems there generally would be a large number of requests for inserting and updating the data and a relatively small number of requests to select and view the data. Although the number of insert and update requests is high, the processing time for each request is short and it only affects one row of data in the table per request. There generally is a smaller number of requests for selecting and viewing data or for report generation. The requests for selecting and viewing data can cover a large domain of data and they can require a relatively long processing time.

When a user is selecting or viewing data in a particular area or domain of a data table, other users who may want to insert or update data in the same domain of the same table are "locked out" of the system until the operation by the user who is viewing or selecting data is complete. This can lead to a significant amount of wasted time waiting for the system to respond.

OBJECTS OF THE INVENTION

An object of the present invention is to provide an improved relational data base system.

Another object of the present invention is to provide a relational data base system which operates rapidly.

Yet another object of the present invention is to provide a data base system with reduced "lock wait" situations.

Still another object of the present invention is to provide a system which includes a relational data base operating in a virtual machine environment which allows insert and update requests to be queued.

Yet another operation of the present invention is to provide a system which allows an operator to enter into the overall system an insert or update request (which will operate on a particular domain of a relational data base) while another operator is doing a select operation on this same domain of the data base.

SUMMARY OF THE INVENTION

The present invention is directed to a relational data base system which is operating in a virtual machine environment. The invention provides a system that includes a disconnected virtual machine which is running in the same virtual machine environment as is the relational data base. Insert and Update requests to the system are generated by programs running in user controlled virtual machines. Other users issue select and view requests which lock out insert and update requests which relate to the same data domain. With the present invention Insert and Update requests go to the disconnected virtual machine which queues them and applies them against the relational data base in the order that the requests are received. In this way, while a select is being executed on data in a particular domain of the data base, update and insert request for the same domain will be held by the virtual machine and the operator will not be "locked out" of the system.

The foregoing and other objects, features and advantages of the invention will be apparent from the following more particular description of a preferred embodiment of the invention as illustrated in the accompanying drawings.

DETAILED DESCRIPTION

Figure 1:
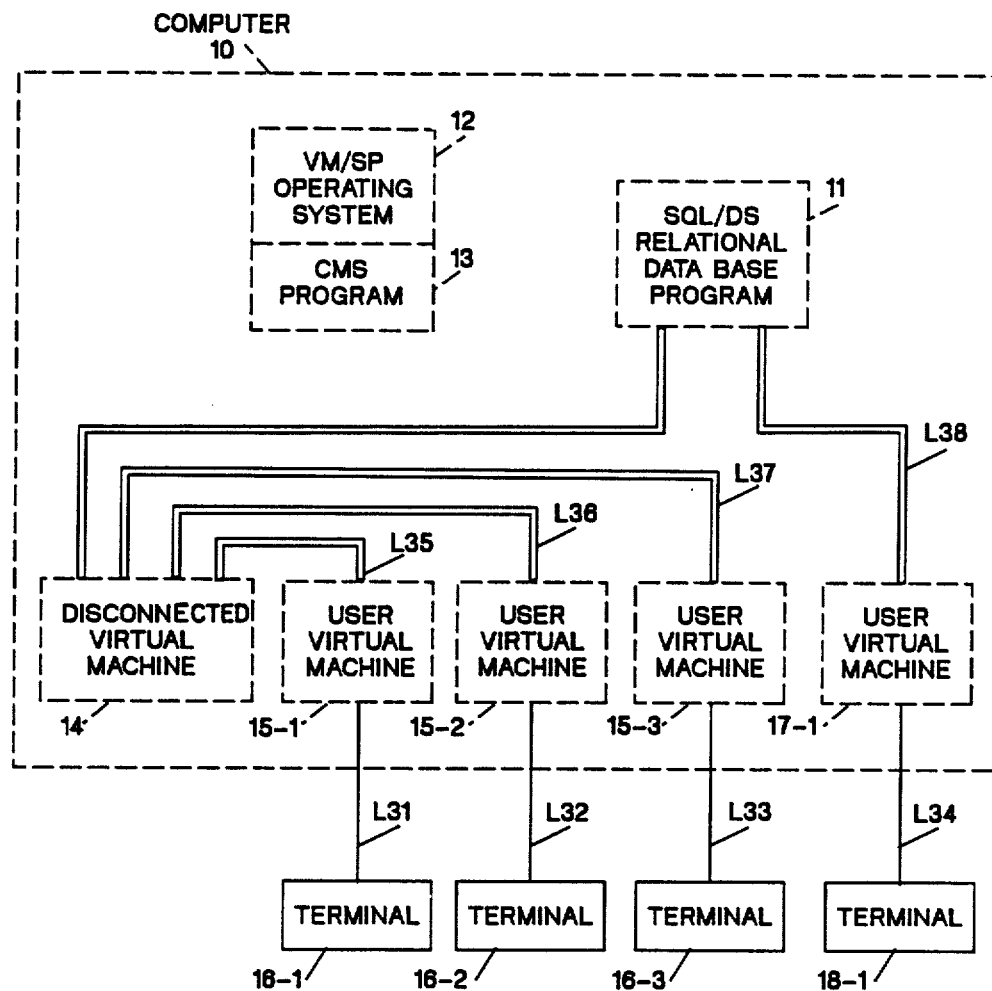
FIG. 1 is a diagrammatic or schematic drawing which shows a computer system with a relational data base system and the various interconnected virtual machines that constitute the present invention.

The specific embodiment of the present invention is shown schematically in the drawing includes an IBM model 4381 computer 10 which is operating under a commercially available operating system 12 known as the IBM VM/SP Operating system. The particular computer utilized is not particularly relevant to the present invention and an IBM model 4381 is shown merely for the purpose of illustration.

The IBM model 4381 computer is commercially available and it will not be described further herein. Likewise the VM/SP operating system 12 will not be further described since it is commercially available and it is described among other places in a manual entitled "*Virtual Machine/Systems Product Introduction*" commercially and publicly available from IBM as publication number GC19-6200 and in the other manuals that are referenced therein.

The IBM VM/SP operating system 12 includes a conversational monitor system 13 generally known as CMS. This system is commercially available and it is described in a commercially available publication entitled *CMS Command and Macro Reference* which is publicly available from IBM as publication number SC19-6210.

A Relational data base program 11 called the IBM SQL/DS program is running in computer 10 under CMS program 13. The IBM SQL/DS program 11 is commercially available from IBM as program product number 5748XXJ-B. This program is described in a manual which is commercially available from IBM as publication number SC19-6200.

The system also includes a disconnected virtual machine 14, and a plurality of user virtual machines 15-1, 15-2, 15-3, 17-1 etc. A number of user terminals 16-1, 16-2, 16-3 are used by operators who issue Insert and Update requests to Data Base program 11. A terminal 18-1 is used by an operator who issues Select and View requests to Data Base Program 11. There can be many more terminals than the number shown; however, four terminals are enough to demonstrate the principles of the present invention.

The manner of setting up disconnected virtual machine 14 and the manner of setting up the virtual machine 15-1, 15-2, 15-3, and 17-1 is not explained in detail herein, since this is described in the commercially available IBM publication related to the VM/SP operating system which were previously referenced.

The present invention is only concerned with how the various virtual machines interrelate with the relational data base.

Figure 2:
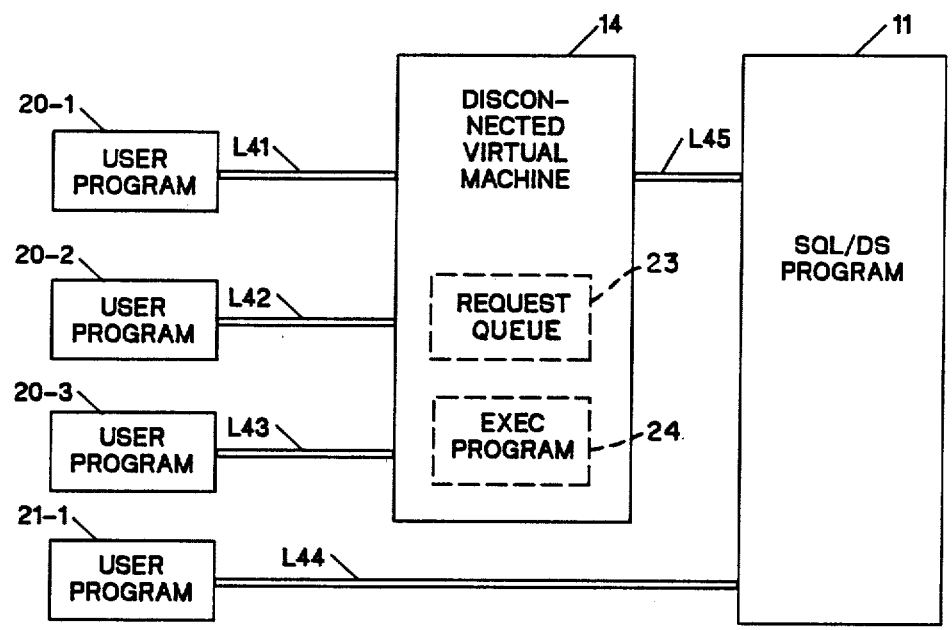
FIG. 2 is a flow diagram that shows the general flow of information through the system.

The interrelation between the programs and hardware is shown in two different ways in FIGS. 1 and 2. FIG. 1 shows that each of the terminals 16-1, 16-2 16-3 and 18-1 has an associated virtual machine. This is common practice in a virtual machine operating environment. Of particular note is that the virtual machines 15-1, 15-2 and 15-3 send Insert and Update requests which originate in terminals 16-1, 16-2 and 16-3 to disconnected Virtual machine 14 via paths L35, L26, and L37. Virtual machine 17-1 sends select and view requests that originate in terminal 18-1 directly to data base program 11 via path L38. Paths L35, L36, L37 and L38 are each conventional Virtual machine interconnections which can accommodate file transfers.

FIG. 2 shows user programs 20-1, 20-2 and 20-3 that are respectively operating in User virtual machines 15-1, 15-2, and 15-3 and user program 21-1 which is operating in virtual machine 17-1. User programs 20-1, 20-2 and 20-3 issue Insert and Update requests that go to disconnected virtual machine 14 over paths L41, L42 and L43. Disconnected virtual machine 14 has an EXEC program 24 which creates a request que 23. Insert and Update requests are sent to data base program 11 from virtual machine 14 over path L45.

User program 21-1 issues conventional Select and View requests and these are sent directly to data base program 11 in a conventional manner.

In the operation of data base program 11, when user program 21-1 issues a conventional Select or a View request to data base program 11, the data base 11 "locks out" Insert and Update requests that are issued relative to the same data table and the same data domain. This "lock out" condition exists during the entire time that the data base is operating upon the Select or the View request.

With the present system, Insert and Update requests issued by User programs 20-1, 20-2 and 20-3 go to disconnected virtual machine 14 and they are held and qued. Hence, the operators at terminals 16-1, 16-2 and 16-3 can continue to operate even though the data base 11 is locking out certain requests. This results in a significant increase in productivity for the operators of terminals 16-1, 16-2 and 16-3.

It is noted that in the prior art system, when an Insert or Update requests is issued against a data domain that is "locked out" by the data base, the terminal is effectively rendered useless during the lock out period since the terminal is "locked" until the data base responds that the locked condition has been released.

The following is a pseudo code description for an EXEC program 24 in disconnected Virtual Machine 14.

As will be explained, files are sent to virtual machine 14 from the user machines 15-1, 15-2, 15-3 etc.

The files coming to virtual machine 14 from the user machines 15-1, 15-2, 15-3, etc. are either INSERT or UPDATE requests.

The INSERT requests have: a file type of INSERT and a file name indicating the origin of the file, for example a file might be named USER1 INSERT The UPDATE requests have: a file type of UPDATE and a file name indicating the origin of the file, for example a file might be named USER1 UPDATE The EXEC in virtual machine 14 is named CHECK:
The pseudo code for the EXEC is:
Start CHECK EXEC
LOOP
* Periodically the reader of the virtual machine 14 is checked:
Check the current time
If current time equals predefined then;
Check reader for files
If files exist then;
Loop as follows until all reader files have been processed
Read file and process as follows:
* The INSERT requests are processed:
When file type equal INSERT then; Execute SQL/DS insert request command *this will insert the data into the data base* Delete file from reader end;
* The UPDATE requests are processed: When file type equals UPDATE then; Execute Update request command *this will update data in the database* Delete file from reader end;
*files other than INSERT or UPDATE are not handled by this EXEC: When file type not equal INSERT or UPDATE then; Forward file to System Administrator Delete file from reader end; Else—end.

The following is a specific example of an inventory program 20-1, 20-2, 20-3 etc. in the user machines 15-1, 15-2, 15-3 etc.

This program sends INSERT requests to disconnected virtual machine 14.

Note: CONTROL is the user ID of disconnected Virtual Machine 14

Inventory Program Pseudo Code:

If INSERT or UPDATE request Keys on the terminals 16-1, 16-2, or 16-3 are pressed the EXEC program in virtual machines 15-1, 15-2, 15-3, etc. branches to an EXEC which implements the following pseudo code:
Then do:

If INSERT key then do;
Create file with 'file type' of INSERT
Add insert request to file
Send file to CONTROL ID
Erase file end do;

When terminal 18-1 issues a select request on data in a particular data domain in a table in relational data base 11, virtual machine 17-1 branches to an EXEC that sends the select request to data base program 11 in a conventional manner.

While the above program have been defined in pseudo code, it will be understood by those skilled in the art, that in an actual system, the programs would be coded in an EXEC language such as REXX or in any one of a variety of other known languages such as PL I. The manner of doing this is defined in the previously referenced commercially available publications and it is well with the skill of the art to transform pseudo code such as that given above into an executable EXEC program for a virtual machine.

While the invention has been particularly shown and described with reference to a preferred embodiment thereof, it will be understood by those skilled in the art that various changes in form and detail may be made therein without departing from the spirit and scope of the invention.

What I claim is:

1. In a computer system having an operating system program which provides a virtual machine environment, a data base mechanism and a data base program operating in the virtual machine environment and controlling the data base mechanism, such data base program being responsive to insert, update, select and view requests from user terminals, which requests operate on user selected data domains in the data base mechanism, wherein during the execution of a select or view request for a particular data domain a user terminal issuing an insert or update request for this same particular data domain will be held in a locked condition until completion of the executing select or view request, the improvement comprising:

(1) providing an insert/update control program for accepting insert and update requests and freeing the user terminals issuing the insert and update requests for enabling such terminals to proceed with other work, such insert/update control program including:

(a) means responsive to each insert and update request for testing the data base program for determining whether a data domain addressed by the request is free for use, (b) means for sending the request to the data base program for execution if the addressed data domain is free, (c) means for placing the request in a request queue if the addressed data domain is not free, and (d) means for periodically checking the request queue and retesting the data base program as long as any request is pending in the request queue and for sending any such queued request to the data base program when the addressed data domain becomes free; and (2) providing for each user terminal a program selector means for sending select and view requests directly to the data base program and for sending insert and update requests to the insert/update control program.

2. The improvement of claim 1 wherein the insert/update control program is located in a disconnected virtual machine running in said virtual machine environment.

3. The improvement of claim 1 wherein a user controlled virtual machine is provided for each user terminal and the program selector means for any given user terminal is located in its corresponding user controlled virtual machine.

4. The improvement of claim 1 wherein the data base program is a structured query language/data system (SQL/DS) program.

* * * * *